US005800866A

United States Patent [19]

Myers et al.

[11] Patent Number: 5,800,866
[45] Date of Patent: Sep. 1, 1998

[54] METHOD OF PREPARING SMALL PARTICLE DISPERSIONS

[75] Inventors: David Lewis Myers, Cumming; Leonid Anthony Turkevich, Alpharetta, both of Ga.

[73] Assignee: Kimberly-Clark Worldwide, Inc., Neenah, Wis.

[21] Appl. No.: 758,749

[22] Filed: Dec. 6, 1996

[51] Int. Cl.$^6$ .................. B05D 7/00; B05D 1/38; B05D 3/12

[52] U.S. Cl. .................. 427/220; 427/127; 427/214; 427/375; 427/416; 427/336

[58] Field of Search .................. 427/128, 218, 427/126.3, 100, 130, 336, 127, 375, 220, 214, 216, 443, 416

[56] References Cited

U.S. PATENT DOCUMENTS

| | | | |
|---|---|---|---|
| 3,016,599 | 1/1962 | Perry, Jr. | 28/78 |
| 3,341,394 | 9/1967 | Kinney | 161/72 |
| 3,655,862 | 4/1972 | Dorschner et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,745,142 | 7/1973 | Mahlman | 260/41 |
| 3,755,527 | 8/1973 | Keller et al. | 264/210 |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,978,185 | 8/1976 | Butin et al. | 264/93 |
| 4,002,779 | 1/1977 | Nischwitz | 427/124 |
| 4,064,605 | 12/1977 | Akiyama et al. | 28/103 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,118,531 | 10/1978 | Hauser | 428/224 |
| 4,192,902 | 3/1980 | Lu | 427/127 |
| 4,308,223 | 12/1981 | Stem | 264/22 |
| 4,340,563 | 7/1982 | Appel et al. | 264/518 |
| 4,405,297 | 9/1983 | Appel et al. | 425/72 |
| 4,434,204 | 2/1984 | Hartman et al. | 428/198 |
| 4,544,579 | 10/1985 | Mullins et al. | 427/175 |
| 4,588,537 | 5/1986 | Klaase et al. | 264/22 |
| 4,592,815 | 6/1986 | Nakao | 204/165 |
| 4,626,263 | 12/1986 | Inoue et al. | 55/155 |
| 4,627,811 | 12/1986 | Greiser et al. | 425/72 S |
| 4,644,045 | 2/1987 | Fowells | 526/348 |
| 4,652,282 | 3/1987 | Ohmori et al. | 55/155 |
| 4,663,220 | 5/1987 | Wisneski et al. | 428/22 |
| 4,789,504 | 12/1988 | Ohmori et al. | 264/22 |
| 4,844,977 | 7/1989 | Nakamura et al. | 427/128 |
| 4,877,694 | 10/1989 | Solomon et al. | 427/115 |
| 4,904,562 | 2/1990 | Yusa et al. | 428/403 |
| 4,959,295 | 9/1990 | Nebe et al. | 427/96 |
| 4,963,390 | 10/1990 | Lipeles et al. | 427/100 |
| 5,053,273 | 10/1991 | Inada et al. | 427/128 |
| 5,055,322 | 10/1991 | Yamamoto | 427/128 |
| 5,057,710 | 10/1991 | Nishiura et al. | 307/400 |
| 5,110,620 | 5/1992 | Tani et al. | 427/40 |
| 5,112,677 | 5/1992 | Tani et al. | 428/240 |
| 5,270,121 | 12/1993 | Kissel | 428/522 |
| 5,401,446 | 3/1995 | Tsai et al. | 264/22 |
| 5,409,766 | 4/1995 | Yuasa et al. | 428/224 |
| 5,409,880 | 4/1995 | Itabashi et al. | 427/152 |
| 5,503,938 | 4/1996 | Arudi | 428/423.1 |
| 5,510,179 | 4/1996 | Fukushima et al. | 428/402 |
| 5,605,723 | 2/1997 | Ogi et al. | 427/126.3 |

FOREIGN PATENT DOCUMENTS

| | | | |
|---|---|---|---|
| 0 594 123 | 4/1994 | European Pat. Off. | 55/524 |
| 0 615 007 | 9/1994 | European Pat. Off. . | |
| 0 623 941 | 11/1994 | European Pat. Off. | 204/168 |
| 0 639 611 | 2/1995 | European Pat. Off. . | |

OTHER PUBLICATIONS

"Superfine Thermoplastic Fibers" by V. A. Wente, Industrial and Engineering Chemistry, vol. 48, No. 8, pp. 1342–1346 (1956) (no month) considered only to extent text was legible.

"Manufacture of Superfine Organic Fibers", by V. A. Wente et al., Navy Research Laboratory, Washington, D.C., NRL Report 4364 (111437), May 25, 1994, US Dept. of Commerce, Office of Technical Services.

"Melt Blowing –A One–Step Web Process for New Nonwoven Products" by R. R. Butin et al., Journal of the Technical Association of the Pulp and Paper Industry, vol. 56, No. 4, pp. 74–77 (1973) Apr.

Ferroelectric Polymers by Karol Mazur, Ch. 11 entitled "Polymer–Ferroelectric Ceramic Composites", pp. 539–610. (No Date).

Primary Examiner—Diana Dudash
Attorney, Agent, or Firm—William E. Maycock

[57] ABSTRACT

A method of preparing a dispersion of small particles in a polymeric precursor, which method involves providing a mixture of a particulate material and a surfactant in a nonaqueous solvent, forming a dispersion of the particulate material in the nonaqueous solvent, combining the resulting dispersion of particulate material in the nonaqueous solvent with a precursor material, and heating the combination of the dispersion of particulate material and the precursor material, with mixing, to a temperature sufficient to volatilize the nonaqueous solvent. The surfactant is soluble in the nonaqueous solvent and is adapted to stabilize the particulate material against agglomeration. The nonaqueous solvent swells the polymeric precursor near the boiling point of the nonaqueous solvent. The boiling point of the nonaqueous solvent is greater than a temperature at which the polymeric precursor may be mixed and below a temperature at which the polymeric precursor polymerizes or decomposes. In certain embodiments, the particulate material is an inorganic material. For example, the inorganic material may be a ferroelectric material, such as barium titanate and lead titanate. In other embodiments, the particulate material is a ferromagnetic material, such as magnetite and barium ferrite.

24 Claims, No Drawings

METHOD OF PREPARING SMALL PARTICLE DISPERSIONS

CROSS-REFERENCE TO RELATED APPLICATION

The method described and claimed in this application is described but not claimed in copending and commonly assigned application Ser. No. 08/762,213, pending.

BACKGROUND OF THE INVENTION

The present invention relates to a dispersion of small particles in a liquid medium.

It often is either desirable or necessary to form a dispersion of a solid or particulate material in a liquid or another solid medium. The addition of pigments to oil and aqueous (or latex) paints are excellent examples of dispersions of solid pigment(s) in a fluid carrier which forms a continuous liquid phase. Likewise, pigments and organic dyes are added to solid materials in order to impart various color attributes to otherwise colorless materials. The technology for preparing dispersions of these types is well known. Typically, aqueous particle dispersions are combined with the continuous phase material in a process called flushing. The particles are incorporated into the continuous phase and the water is either poured off or removed by heating under vacuum.

The formation of small particle dispersions is complicated by the tendency for the particles to agglomerate into large macroscopic aggregates. Large aggregates are undesirable since they lead to nonuniform coloration in the case of pigments, or nonuniform physical properties in the case of other additives. In aqueous dispersions of small particles, surfactants are used to "stabilize" the particles against reagglomeration and thereby prevent the problems mentioned above.

In nonaqueous media, the role of surfactants is less well understood. Small particles dispersed in nonaqueous media suffer the same agglomeration problems as those in aqueous media; however, in nonaqueous media the behavior of surfactant-like molecules is likely very different from that in aqueous media. If the agglomeration of small particles can be overcome in the nonaqueous media, then the nonaqueous dispersion affords significant advantages in the formation of other solid-liquid, solid—solid, and solid-semi-solid dispersions.

While the formation of nonaqueous, or oil-based, particle dispersions is well known, their use as intermediates in the formation of other types of particle dispersions is not. For example, the above-referenced application Ser. No. 08/762, 213, which is incorporated herein by reference in its entirety, describes the preparation of fibers containing particles of a ferroelectric material. The preparation of the fibers requires first forming a dispersion of the particles in a nonaqueous solvent and then dispersing the particles in an organic wax. The present invention represents an improvement in the preparation of the wax dispersion.

SUMMARY OF THE INVENTION

The present invention relates to a dispersion of small particles in a liquid or polymeric medium. In either case, the liquid or polymeric medium forms a continuous phase while the particles are present as a discontinuous phase. The present invention addresses some of the difficulties and problems discussed above by providing a method of preparing a dispersion of small particles in a polymeric precursor, which method involves providing a mixture of a particulate material and a surfactant in a nonaqueous solvent, forming a dispersion of the particulate material in the nonaqueous solvent, combining the resulting dispersion of particulate material in the nonaqueous solvent with a precursor material, and heating the combination of the dispersion of particulate material and the precursor material, with mixing, to a temperature sufficient to volatilize the nonaqueous solvent. The surfactant is soluble in the nonaqueous solvent and is adapted to stabilize the particulate material against agglomeration. The nonaqueous solvent swells the polymeric precursor near the boiling point of the nonaqueous solvent. Finally, the boiling point of the nonaqueous solvent is greater than a temperature at which the polymeric precursor may be mixed and below a temperature at which the polymeric precursor polymerizes or decomposes.

In certain embodiments, the particulate material is an inorganic material. For example, the inorganic material may be a metal oxide.

DETAILED DESCRIPTION OF THE INVENTION

As used herein, the term "polymeric precursor" is meant to include, by way of illustration only, a low molecular weight organic polymer wax (organic wax), an oligomer (or a macromer), and a monomer.

The term "organic wax" is used herein to mean an organic polymeric material which may be a liquid, semisolid, or solid at ambient temperature, i.e., at a temperature of 20°–25° C. Typical liquids include, by way of example only, low weight-average molecular weight ($M_w$) oligomeric forms of polyethylene, polypropylene, and polyisobutylene. Typical semisolids include, again by way of example only, polyisobutylene ($M_w$=100,000) and atactic polypropylene. Typical solids included, further by way of example only, polyethylene ($M_w$=1,000–4,000), polypropylene ($M_w$=1,000–4,000), and various carboxylate-, amide-, and alcohol-based waxes.

The term "ferroelectric material" is used herein to mean a crystalline material which possesses a spontaneous polarization which may be reoriented by the application of an electric field. The term includes any phase or combination of phases exhibiting a spontaneous polarization, the magnitude and orientation of which can be altered as a function of temperature and externally applied electric fields. The term also is meant to include a single ferroelectric material and mixtures of two or more ferroelectric materials of the same class or of different classes. The term further includes a "doped" ferroelectric material, i.e., a ferroelectric material which contains minor amounts of elemental substituents, as well as solid solutions of such substituents in the host ferroelectric material.

The structure of crystalline materials typically is described in terms of 32 distinct symmetry groups. Of these, 21 are noncentrosymmetric. That is, they do not possess a center of symmetry. Of the noncentrosymmetric groups, 20 are piezoelectric, and of these 20, only 10 are referred to as being pyroelectric. Pyroelectric materials are unique in that they possess a spontaneous electrical polarization which is directly attributable to permanent dipoles which exist on the unit cell level within individual crystals. The alignment of dipoles along a crystallographic axis of the material yields a net spontaneous polarization in the material. Pyroelectric materials also are referred to as polar solids. As the name implies, "pyroelectric" refers to changes in the magnitude and direction of the spontaneous polarization with changes in temperature. Ferroelectric materials are a subgroup of the spontaneously polarized pyroelectric materials. The magnitude and direction of the spontaneous polarization in ferroelectric materials respond to both temperature and the presence of externally applied electric fields.

All ferroelectric materials exhibit a "Curie point" or "Curie temperature," which refers to a critical temperature above which the spontaneous polarization vanishes. The Curie temperature often is indicated herein as "$T_c$."

Examples of ferroelectric materials include, without limitation, perovskites, tungsten bronzes, bismuth oxide layered materials, pyrochlores, alums, Rochelle salts, dihydrogen phosphates, dihydrogen arsenates, guanidine aluminum sulfate hexahydrate, triglycine sulfate, colemanite, and thiourea. Several of the more useful of these classes are reviewed in detail below.

Perovskites

Perovskites are mixed metal oxides of $ABO_3$ stoichiometry. Perovskites have a very simple cubic structure made up of corner-sharing oxygen octahedra with small, highly-charged cations like titanium (Ti), tin (Sn), zirconium (Zr), niobium (Nb), tantalum (Ta), and tungsten (W) occupying the central octahedral B site, and lower charged, large cations like sodium (Na), potassium (K), rubidium (Rb), calcium (Ca), strontium (Sr), Barium (Ba), and lead (Pb), etc., filling the interstices between the oxygen octahedra in the larger 12-coordinated A sites. The ferroelectricty associated with these materials arises from lattice distortions, occurring below the Curie temperature, which result in the development of very large dipoles within the crystals.

Perovskites are unique in their ability to form a wide variety of solid solutions, from simple binary and ternary solutions to very complex multicomponent solutions. Some examples include, but are not limited to, $BaSrTiO_3$, $KBaTiO_3$, $Pb(Co_{0.25}Mn_{0.25}W_{0.5})O_3$, and numerous forms of barium titanate and lead titanate doped with niobium oxide, antimony oxide, and lanthanum oxide, to name a few by way of illustration only. The ability to form extensive solid solutions of perovskite-type compounds allows one skilled in the art to systematically alter the electrical properties of the material by formation of a solid solution or addition of a dopant phase. For example, the Curie temperature of Barium titanate ($BaTiO_3$) can be systematically increased from 130° C. to 490° C. by substituting lead ions for barium ions, the upper limit of $T_c$ being reached at 100 percent lead ion substitution. Likewise, it generally is known that the $T_c$ of barium titanate can be gradually decreased by substituting strontium ions for barium ions.

Perovskite-Related Octahedral Structures

These materials have a similar structure to that of perovskites, except that the oxygen octahedra are edge sharing rather than corner sharing. Only two materials in this class are of note, namely, lithium niobate ($LiNbO_3$) and lithium tantalate ($LiTaO_3$). For convenience, these materials are included in the term "perovskites."

Tungsten Bronzes

The tungsten bronzes are non-stoichiometric substances having the general formula $M_n^I WO_3$, where $0<n\leq1$ and M is a monovalent metal cation, most typically sodium (Na). The ferroelectric tungsten bronzes typically have values of $n\leq0.3$. Within this family of materials are such compounds as lead metaniobate ($PbNb_2O_6$) and lead metatantalate ($PbTa_2O_6$).

Bismuth Oxide Layered Materials

These are complex layered structures of perovskite layers interleaved with bismuth oxide layers. A typical bismuth oxide layered compound is lead bismuth niobate ($PbBiNb_2O_9$).

Pyrochlores

Pyrochlores again are corner sharing oxygen octahedra similar to the perovskites. However, this family of compounds is more limited in the cation substitutions which can be made. Typical pyrochlores are cadmium niobate and tantalate and lead niobate and tantalate. These materials have Curie temperatures below 200° K. (−73° C.), which may limit their use in some applications.

The term "ferromagnetic material" is used herein to mean a crystalline material which possesses a remnant magnetization induced by the application of a magnetic field. The term includes any phase or combination of phases exhibiting a remnant magnetization, the magnitude of which can be altered as a function of temperature and applied magnetic field. The term includes single, binary, ternary or greater mixtures of ferromagnetic materials of the same class or different classes. The term further includes a "doped" ferromagnetic material.

The term "destructured" and variations thereof means a reduction in size of the particles of the material to be dispersed. The terms "particles" and "agglomerated particles" are intended to mean particles of a material which have not been processed to reduce particle sizes. The term "destructured particles" refers to "particles" or "agglomerated particles" which have been processed, or "destructured," to reduce particle sizes.

In general, any size particles of the material to be dispersed may be employed in the present invention, provided the particles are of a size which will permit the preparation of a dispersion useful in the desired application. For example, the particles may have a longest dimension in a range of from about 10 nanometers to about 10 micrometers. If necessary, the particles may be destructured.

The destructuring of the particles may be accomplished by any means known to those having ordinary skill in the art. For example, destructuring may be accomplished by subjecting the particles to processing in a ball mill, attritor mill, or pin mill. Although processing conditions will vary, depending upon the design and operation of the ball mill employed, suitable conditions may be readily determined by those having ordinary skill in the art. Destructuring typically is carried out in the presence of a nonaqueous solvent and a surfactant, wherein the surfactant is soluble in the solvent and is adapted to stabilize the destructured particles against agglomeration.

In general, the method of the present invention utilizes a nonaqueous solvent dispersion of particles, a surfactant adapted to stabilize the particles against agglomeration, and the polymeric precursor material. As already noted, the nonaqueous solvent and surfactant are used to form a solvent dispersion of the particles. The solvent dispersion can be made by a variety of particle-dispersing methods, such as ball milling, small media milling, or high shear/attritor milling, to name but a few.

The nonaqueous solvent is selected to have a boiling point which is greater than the softening temperature of a polymeric precursor, which is a solid at ambient temperature, or greater than the temperature needed to reduce the viscosity of a liquid polymeric precursor to a point where it can be mixed. In addition, the boiling point of the solvent must also be below the decomposition temperature of the polymeric precursor and/or below temperatures capable of initiating polymerization.

In general, any liquid may be employed which is a solvent for the surfactant. The surfactant, in turn, is adapted to stabilize the destructured particles against agglomeration.

Suitable liquids include, by way of example only, aliphatic hydrocarbons, such as hexane, heptane, octane, and decane; aromatic hydrocarbons, such as xylene, toluene, and cumene; aliphatic alcohols, such as 2-propanol, 1-butanol, 1-hexanol, and benzyl alcohol; aliphatic ketones, such as methyl ethyl ketone; halogenated hydrocarbons, such as dichloromethane, chloroform, carbon tetrachloride, and chlorobenzene; and polar solvents, such as water, tetrahydrofuran, and N,N-dimethylpyrolidinone.

Desirably, the liquid will be an aliphatic alcohol having from about 3 to about 10 carbon atoms. For example, the aliphatic alcohol may be a normal alcohol having from about 4 to about 10 carbon atoms, such as 1-butanol, 1-pentanol, 1-hexanol, 1-heptanol, 1-octanol, and 1-nonanol. As another example, the aliphatic alcohol may include a branched alkyl group. Examples of such alcohols include, without limitation, 2-propanol, 2-butanol, 2-methyl-2-propanol, 2-pentanol, 3-pentanol, 2-methylbutanol, 3-methylbutanol, 2-hexanol, 3-hexanol, 3,3-dimethylbutanol, 3-heptanol, 4-heptanol, 2-ethyl-i-pentanol, 4-octanol, 3,3-dimethyl-1-hexanol, 5-nonanol, 6,6-dimethyl-2-heptanol, 5-ethyl-3-heptanol, 2-decanol, and 3,4,7-trimethyl-1-heptanol.

The types of surfactants which may be employed in the method of the present invention include cationic, anionic, nonionic, and zwitterionic surfactants. In some cases, it may be desirable to use a mixture of two or more surfactants to stabilize the destructured ferroelectric particles. Examples of cationic surfactants include, by way of illustration only, aliphatic and aromatic primary, secondary, and tertiary amines, ethoxylated alkylamines; amine oxides; amide-linked amines; and quaternary ammonium salts. Examples of anionic surfactants include, again by way of illustration only, carboxylic acids and salts; sulfonic acids and salts; fatty acids, such as oleic acid; lignosulfonates; alkylbenzenesulfonates; alkylarylsulfonates; petroleum sulfonates; sulfonates with ester, ether, or amide linkages; sulfuric acid esters and salts; sulfated alcohols; sulfated ethoxylated alcohols; sulfated ethoxylated alkylphenols; sulfated acids; sulfated amides; sulfated esters; sulfated natural fats and oils; ethoxylated alkylphosphate esters; phosphoric acid and polyphosphoric acid esters and salts; phosphated alcohols; phosphated phenols; phosphated alkoxylated alcohols; phosphated alkoxylated phenols; and salts of each class of phosphated anionic surfactant. Examples of nonionic surfactants include, also by way of illustration only, ethoxylated alcohols; ethoxylated alkylphenols; ethoxylated carboxylic acid esters; glycerol esters; polyethylene glycol esters; sorbitol esters; ethoxylated natural fats and oils; ethylene and diethylene glycol esters; propanediol esters; and ethoxylated carboxylic acid amides.

The surfactant generally is employed in an amount sufficient to stabilize the destructured ferroelectric material against agglomeration. For example, the surfactant may be present in a range of from about 0.01 to about 10 percent by weight, based on the total amount of ferroelectric material being destructured and stabilized against agglomeration. Desirably, the surfactant will be present in a range of from about 0.01 to about 1 percent by weight.

The nonaqueous solvent and polymeric precursor mixture may be composed of one or two phases when the temperature of the mixture is at or above the boiling point of the nonaqueous solvent. In the case of a two phase system, the phase composition is determined by the relative miscibilities of the components. Near its boiling point, the nonaqueous solvent may function as either a solvent or a nonsolvent for the polymeric precursor. In either case, the nonaqueous solvent swells the polymeric precursor at or near the boiling point of the nonaqueous solvent.

In one embodiment, the nonaqueous solvent/particle dispersion (or solvent dispersion) is blended with the polymeric precursor while it is heated to remove the solvent by vaporization, leaving the particles dispersed in the polymeric precursor. If the solvent dispersion-polymeric precursor blend is a single phase at the boiling point of the solvent, then vaporization of the volatile solvent will leave the small particles in an increasingly precursor-rich medium. When complete removal of the solvent is achieved, a particle-polymeric precursor dispersion will be formed. If the solvent dispersion-polymeric precursor blend is consists of two phases, the particles will partition between the phases as the volatile solvent is removed by vaporization. Again, complete removal of the nonaqueous solvent will result in the formation of a particle-polymeric precursor dispersion.

The present invention is further described by the examples which follow. Such examples, however, are not to be construed as limiting in any way either the spirit or the scope of the present invention.

EXAMPLE 1

Solvent Dispersion Preparation

Barium titanate (BaTiO$_3$) was TICON 5016, obtained from Tam Ceramics, Inc. (Niagra Falls, N.Y.). The solvent dispersion was prepared using a large scale stainless steel mixing tank (ca. 130 gal or 492 liters) equipped with a pneumatically driven stirrer. The dispersion was processed through a high speed stainless steel pin/attriter mill powered by a 50 hp electric motor operating at 1750 rpm. The mixing tank and pin/attriter mill were custom built by Standridge Color Corporation (Social Circle, Ga.). The bottom half of the mixing tank was funnel shaped. The mixing tank was connected to a pneumatic pump and in turn the pump was connected to the pin/attriter mill using a 2.5-inch (about 10-cm) diameter flexible hose. The effluent from the mill was recycled into the top of the mixing tank. The pneumatic pump had a displacement of 0.25 gal (about 0.95 liter) per stroke and was operated at rate which provided a flow of 8–10 gal/min (about 0.5–0.6 liter/sec).

The mixing tank was filled with 190 lb. (86.4 kg) of technical grade 1-butanol. Then, 7.2 lb (3.27 kg) of Rhodameen® PN430 (Rhone-Poulenc) was added with vigorous stirring. The barium titanate was added in 55-lb (about 25-kg) portions until a total of 770 lb (about 350 kg) had been added to the mixing tank. The slurry was pumped to the high speed pin/attriter mill and recycled to the mixing tank for approximately 30 min. The resultant 1-butanol dispersion was uniform in composition and contained 80 weight-percent barium titanate.

Polyethylene Wax Dispersion Formation

The 80 weight-percent barium titanate/1-butanol dispersion was added directly to a molten low molecular weight polyethylene (PE) wax (Allied Signal A-C 16). In the present example, the stabilized colloidal particles of barium titanate were partioned from a 1-butanol rich phase into a PE wax rich phase and the 1-butanol was removed by vaporization. This process differs from water/wax flushing in that the 1-butanol boils above the melting point of the A-C 16 PE wax. The wax was melted in a 150-gal (about 568-liter) steam-heated vat equipped with rotating blades which slowly blend the mixture. Steam was supplied to the vat at 50 psig, corresponding to a temperature of about 297° F. (about 147° C.).

In this example, 969.20 lb. (440.55 kg) of 1-butanol/barium titanate/Rhodameen® PN-430 dispersion was combined with 190.8 lb. (86.73 kg) of A-C 16 PE wax. The molten wax and 1-butanol dispersion were blended continuously until no alcohol vapor was detected over the mixture. At this point, the BaTiO$_3$/Rhodameen® PN-430/A-C 16 PE wax dispersion was poured into a tray to cool to room temperature. The solidified wax composite was further cooled to dry ice temperature and ground to a coarse powder for dry blending with polypropylene.

Polypropylene Compounding

The BaTiO$_3$/Rhodameen® PN-430/A-C 16 PE wax composite, 832 lb (about 378 kg) was dry blended with 2,496 lb (about 1339 kg) of Montel Profax® PF-015 polypropylene (PP). The dry mixture was melt blended using a single screw compounding extruder to give a mixture containing 20 weight-percent of barium titanate. Examination of a thin film prepared from the blend under an optical microscope revealed well dispersed small particles in a continuous polypropylene matrix.

EXAMPLE 2

A 600-lb. (273-kg) portion of the 20 weight-percent concentrate prepared in Example 1 was then blended with 1800 lb (about 818 kg) of Montel Profax® PF-015 polypropylene. This dry blend was melt blended using a single screw compounding extruder to yield a 5 weight-percent barium titanate/polypropylene composite.

Nonwoven Fabric Formation

Nonwoven fabrics were manufactured on a 100-inch (about 2.5-meter) meltblown line essentially as described in U.S. Pat. No. 3,849,241 to Buntin et al., which patent is incorporated herein by reference. The 100-inch wide web was slit into five 20-inch (about 51-cm) sections. Meltblowing conditions were held constant for all materials. All fabrics had a nominal basis weight of 0.6 osy (about 20 gsm). The 20 weight-percent barium titanate/polypropylene composite was dry blended at a rate of 1 part to 19 parts of virgin Montel Profax® PF-015 polypropylene to yield a meltblown fabric containing about 1 weight-percent barium titanate. In addition, the 5 weight-percent barium titanate/polypropylene composite was processed without further dilution. Finally, virgin Montel Profax® PF-015 polypropylene was meltspun to produce a control. All meltblown nonwoven webs were electret treated on-line under identical conditions. The electret treatment was carried out in accordance with the teachings of U.S. Pat. No. 5,401,446 to Tsai et al., described earlier.

RESULTS

Air Filtration Measurements

The air filtration efficiencies of the meltblown nonwoven webs were evaluated using a TSI, Inc. (St. Paul, Minn.) Model 8110 Automated Filter Tester (AFT). The Model 8110 AFT measures pressure drop and particle filtration characteristics for air filtration media. The AFT utilizes a compressed air nebulizer to generate a sub-micron aerosol of sodium chloride particles which serves as the challenge aerosol for measuring filter performance. The characteristic size of the particles used in these measurements was 0.1 micrometer. Typical air flow rates were between 31 liter per minute and 33 liters per minute. The AFT test was performed on a sample area of ca. 140 cm$^2$. The performance or efficiency of a filter medium is expressed as the percentage of sodium chloride particles which penetrate the filter. Penetration is defined as transmission of a particle through the filter medium. The transmitted particles were detected downstream from the filter. The percent penetration (% P) reflects the ratio of the downstream particle count to the upstream particle count. Light scattering was used for the detection and counting of the sodium chloride particles.

Samples of meltblown material were taken from ten cross deckle positions (i.e. 2 per 20-inch slit) of the nonwoven webs described above. Samples were cut as flat sheets approximately 8-inches square. A minimum of 20 samples were evaluated for pressure drop ($\Delta$p in mm H$_2$O) and percent particle penetration (% P). Tables 1 through 3 summarize the pressure drop and particle penetration data for the control (Montel Profax PF 015) and the barium titanate containing formulations.

TABLE 1

Air Filtration Results for Polypropylene Control Webs

| Cd[a] | Pressure Drop[b] | σ(Δp)[c] | % P[d] | σ(% p)[e] |
|---|---|---|---|---|
| 5 (13) | 2.07 | 0.07 | 17.35 | 0.64 |
| 15 (38) | 1.90 | 0.07 | 20.83 | 1.31 |
| 25 (64) | 2.42 | 0.08 | 13.42 | 1.12 |
| 35 (89) | 2.64 | 0.08 | 11.77 | 1.08 |
| 45 (114) | 2.72 | 0.08 | 11.27 | 0.85 |
| 55 (140) | 2.75 | 0.09 | 12.59 | 1.23 |
| 65 (165) | 2.64 | 0.09 | 13.15 | 1.09 |
| 75 (190) | 2.47 | 0.10 | 13.77 | 1.03 |
| 85 (216) | 2.24 | 0.05 | 17.29 | 1.19 |
| 95 (241) | 2.32 | 0.06 | 14.09 | 1.06 |

[a]Cross-deckle position, inches (cm).
[b]In mm water.
[c]Standard deviation of pressure drop measurements.
[d]Percent penetration
[e]Standard deviation of percent penetration measurements.

TABLE 2

Air Filtration Results for Polypropylene Webs Containing 1 Weight-Percent BaTiO$_3$

| CD[a] | Pressure Drop[b] | σ(Δp)[c] | % P[d] | σ(% p)[e] |
|---|---|---|---|---|
| 5 (13) | 2.26 | 0.08 | 7.85 | 0.58 |
| 15 (38) | 1.92 | 0.06 | 10.98 | 0.87 |
| 25 (64) | 2.25 | 0.07 | 8.46 | 1.06 |
| 35 (89) | 2.57 | 0.09 | 5.99 | 0.41 |
| 45 (114) | 2.73 | 0.09 | 5.68 | 0.63 |
| 55 (140) | 2.79 | 0.11 | 4.86 | 0.42 |
| 65 (165) | 2.49 | 0.08 | 6.88 | 0.62 |
| 75 (190) | 2.47 | 0.09 | 7.08 | 0.58 |
| 85 (216) | 2.21 | 0.07 | 9.88 | 1.12 |
| 95 (241) | 2.18 | 0.06 | 9.59 | 1.01 |

[a]Cross-deckle position, inches (cm).
[b]In mm water
[c]Standard deviation of pressure drop measurements.
[d]Percent penetration
[e]Standard deviation of percent penetration measurements.

TABLE 3

Air Filtration Results for Polypropylene Webs Containing 5 Weight-Percent BaTiO$_3$

| CD[a] | Pressure Drop[b] | σ(Δp)[c] | % P[d] | σ(% p)[e] |
|---|---|---|---|---|
| 5 (13) | 1.81 | 0.06 | 7.05 | 0.41 |
| 15 (38) | 1.67 | 0.05 | 8.85 | 0.63 |
| 25 (64) | 2.3 | 0.07 | 5.83 | 0.44 |
| 35 (89) | 2.53 | 0.07 | 4.97 | 0.63 |
| 45 (114) | 2.72 | 0.13 | 4.08 | 0.33 |
| 55 (140) | 2.59 | 0.11 | 3.86 | 0.39 |

TABLE 3-continued

Air Filtration Results for Polypropylene Webs
Containing 5 Weight-Percent BaTiO₃

| CDᵃ | Pressure Dropᵇ | σ(Δp)ᶜ | % Pᵈ | σ(% p)ᵉ |
|---|---|---|---|---|
| 65 (165) | 2.34 | 0.08 | 4.72 | 0.52 |
| 75 (190) | 2.35 | 0.08 | 4.72 | 0.34 |
| 85 (216) | 2.12 | 0.1 | 6.16 | 0.55 |
| 95 (241) | 2.06 | 0.05 | 6.14 | 0.86 |

ᵃCross-deckle position, inches (cm).
ᵇIn mm water
ᶜStandard deviation of pressure drop measurements.
ᵈPercent penetration
ᵉStandard deviation of percent penetration measurements.

The pressure drop ($\Delta p$) and percent particle penetration (% P) data presented in Tables 1 through 3 clearly demonstrate the superior filtration performance of the meltblown webs prepared from the barium titanate/PP composite materials. All the webs examined are characterized by a cross-deckle profile in the pressure drop and penetration data. The shape of the profile is independent of the material. The pressure drop measured across the web appears to be identical for each of the three materials depicted. This suggests that fiber and web formation are independent of the material being spun (i.e, polypropylene versus barium titanate/PP composite). By contrast, the percent particle penetration is significantly lower for both the 1 weight-percent and 5 weight-percent BaTiO₃ formulations compared to the control polypropylene. Thus, for a given pressure drop through the web, the barium titanate/PP composite evinces superior filter performance (i.e., lower particle penetration) compared to the control polypropylene.

EXAMPLE 3

The procedure of Example 1 was repeated, except that the barium titanate was replaced with lead titanate and destructuring of the particles was accomplished by ball milling as described below.

In a typical batch, approximately 1 kg of lead titanate was vigorously stirred with 2.6 L of 1-butanol and 4–5 mL of the surfactant. The resulting slurry was poured into a 6.2-L Roalox ceramic mill jar (U.S. Stoneware, East Palestine, Ohio) which had been charged with 21 lbs (about 5.4 kg) of zirconia grinding media (U.S. Stoneware). The jar was rolled at 70 rpm for a period of 48 hours on a U.S. Stoneware Unitized Jar Mill, Model 764AVM. At the end of the milling period, the resulting dispersion of was combined with polyethylene wax as described in Example 1.

EXAMPLE 4

The procedure of Example 3 was again repeated, except that the lead titanate was replaced with magnetite, a ferromagnetic material. The dispersion was formed in 1-butanol using oleic acid as the surfactant. Destructuring of the particles was accomplished by ball milling in a 2 L stainless steel mill jar (U.S. Stoneware) utilizing 440 stainless steel grinding media. The jar was filled to half its volume with the grinding media. The mill jar then was rolled at 70 rpm for a period of seven days on a U.S. Stoneware Unitized Jar Mill Model 764AVM.

EXAMPLE 5

The procedure of Example 4 was repeated, except that the magnetite was replaced with another ferromagnetic material, barium ferrite.

EXAMPLE 6

The procedures of Examples 4 and 5 was repeated, except that the surfactant employed was an ethoxylated alkylphosphate ester, Rhodafac® RE-610 (Rhone-Poulenc).

While the specification has been described in detail with respect to specific embodiments thereof, it will be appreciated by those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of preparing a dispersion of particles in an organic wax, an oligomer, or a monomer, the method comprising:

providing a mixture of a particulate material and a surfactant in a nonaqueous solvent, in which the particulate material comprises particles having longest dimensions in a range of from about 10 nanometers to about 10 micrometers;

forming a dispersion of the particulate material in the nonaqueous solvent;

combining the resulting dispersion of particulate material in the nonaqueous solvent with the organic wax, oligomer, or monomer; and heating the combination of the dispersion of particulate material and the organic wax, oligomer, or monomer, with mixing, to a temperature which is the boiling point of the nonaqueous solvent;

wherein:

the surfactant is soluble in the nonaqueous solvent and stabilizes the particulate material against agglomeration;

the nonaqueous solvent swells the organic wax, oligomer, or monomer at or near the boiling point of the nonaqueous solvent; and the boiling point of the nonaqueous solvent is greater than a temperature which is the softening temperature of the organic wax, oligomer, or monomer which is a solid at ambient temperature, or greater than the temperature needed to reduce the viscosity of a liquid organic wax, oligomer, or monomer to a point where it can be mixed, and below a temperature at which the organic wax, oligomer or monomer polymerizes or decomposes.

2. The method of claim 1, in which the particulate material is an inorganic material.

3. The method of claim 2, in which the particulate material is a metal oxide.

4. The method of claim 1, in which the metal oxide is a ferroelectric material.

5. The method of claim 4, in which the ferroelectric material is barium titanate.

6. The method of claim 4, in which the ferroelectric material is lead titanate.

7. The method of claim 3, in which the metal oxide is a ferromagnetic material.

8. The method of claim 7, in which the ferromagnetic material is magnetite.

9. The method of claim 7, in which the ferromagnetic material is barium ferrite.

10. The method of claim 1, in which the surfactant is an ethoxylated alkylamine.

11. The method of claim 1, in which the surfactant is a fatty acid.

12. The method of claim 11, in which the fatty acid is oleic acid.

13. The method of claim 1, in which the surfactant is an ethoxylated alkylphosphate ester.

14. The method of claim 1, in which the nonaqueous solvent is an aliphatic alcohol having from about 3 to about 10 carbon atoms.

15. The method of claim 14, in which the aliphatic alcohol is a normal alcohol having from about 4 to about 10 carbon atoms.

16. The method of claim 15, in which the aliphatic alcohol is 1-butanol.

17. The method of claim 14, in which the aliphatic alcohol includes a branched alkyl group.

18. The method of claim 14, in which the aliphatic alcohol is 2-propanol.

19. The method of claim 14, in which the aliphatic alcohol is 2-butanol.

20. The method of claim 1, in which the nonaqueous solvent is a hydrocarbon.

21. The method of claim 20, in which the hydrocarbon is an aliphatic hydrocarbon having from about 6 to about 10 carbon atoms.

22. The method of claim 20, in which the hydrocarbon is an aromatic hydrocarbon.

23. The method of claim 22, in which the aromatic hydrocarbon is selected from the group consisting of benzene, toluene, cumene, and xylene.

24. The method of claim 1, in which the solvent is 1,1-dimethyl-2-pyrrolidinone.

* * * * *